United States Patent

[11] 3,623,829

| [72] | Inventors | John D. Shaw<br>Concord;<br>Edward H. Gervais, Melrose, both of Mass. |
|---|---|---|
| [21] | Appl. No. | 875,905 |
| [22] | Filed | Nov. 12, 1969 |
| [45] | Patented | Nov. 30, 1971 |
| [73] | Assignee | W. H. Nichols Company<br>Waltham, Mass. |

[54] INTERNAL GEAR SET
6 Claims, 2 Drawing Figs.

| [52] | U.S. Cl. | 418/171,<br>418/225 |
|---|---|---|
| [51] | Int. Cl. | F01c 1/10,<br>F01c 1/00 |
| [50] | Field of Search | 418/61,<br>166, 171, 225 |

[56] References Cited
UNITED STATES PATENTS

| 2,790,394 | 4/1957 | Mori | 418/225 |
|---|---|---|---|
| 3,082,747 | 3/1963 | Luck | 418/171 |
| 3,289,602 | 12/1966 | Hudgens | 418/61 |
| 3,307,525 | 3/1967 | McClure | 418/61 |

*Primary Examiner*—Carlton R. Croyle
*Assistant Examiner*—Wilbur J. Goodlin
*Attorneys*—Townsend M. Gunn, John A. Lahive, Jr. and Kenway, Jenney & Hildreth ABSTRACT: An internal gear set comprising an inner gear having a number of radially projecting cylindrical tooth members engaging a conjugate internally toothed outer gear. The latter has one more tooth than there are tooth members on the inner gear and is mounted eccentrically to the inner gear so that the gears move conjugately relative to one other.

INVENTORS
JOHN D. SHAW
EDWARD H. GERVAIS

BY Kenway, Jenney
 & Hildreth

ATTORNEYS 3,623,829

INTERNAL GEAR SET

BACKGROUND OF THE INVENTION

Internal gear sets have been developed for mechanical transmissions, fluid pumps and fluid-mechanical transmissions, wherein the inner gear or pinion member has one less tooth than the outer gear or internally toothed member. In gear sets of this type, it is known that if the tooth shape of one of the gear members is defined, the tooth shape of the other may be generated as a conjugate shape. Sets of gear members formed by generating conjugate tooth shapes have the property that the teeth of one member are continuously in contact with teeth of the other, making driving contact therewith and forming expanding and contracting chambers therebetween which can be provided with means for circulating fluid therethrough.

Moreover, similar features are realized when the generating tooth form is other than circular, and whether the generating form is that of the inner or outer gear. These features may also be realized when the tooth spaces of the generated form are recessed out of contact with the generating tooth form or the reverse, in which cases the chambers formed therebetween are contracted only to a finite size.

Devices using internal gear sets of the foregoing types are characterized by the fact that the tooth outline of the inner member is centered on an axis spaced from and parallel to the axis on which the tooth outline of the outer member is centered, this spacing being termed the "eccentricity." One cycle is defined as the rotation required for the inner member to advance one tooth in relation to the outer member, and the total volumetric expansion (or contraction) of the spaces between gear teeth of a specified thickness in one cycle is termed the "-displacement" of the gear set.

In a practical device using an internal gear set of the foregoing type, there are a number of ways of supporting the gears. Both gears may be rotated about fixed axes, or either of the gears may be held fixed while the other gear is rotated and orbited in relation to it. As between these alternatives the choice is determined to some extent by end use considerations.

The gear sets hitherto developed for pumps, motors, power steering linkages and other applications have definite limiting properties such as weight, diameter, displacement and wear characteristics resulting from such factors as the number of teeth, the eccentricity and the tooth shapes employed.

The objects of this invention are to improve the properties of internal gear sets. This includes not only obtaining a greater displacement for a given outer diameter and gear thickness, but also obtaining a reduction in weight and in sliding friction between the teeth, such friction resulting in galling, welding, scoring and reduced efficiency in the sets commonly in use, resulting in a reduction in useful life.

SUMMARY OF THE INVENTION

This invention achieves the foregoing objects by providing a novel construction of internal gear sets characterized by an inner gear consisting of a support having a predetermined number of recesses equally spaced about its periphery, a tooth member received in each recess and an outer gear formed as the conjugate of the inner gear. Improvements are achieved in several useful properties of the gear sets, these improvements resulting from the foregoing novel structure as hereinafter more specifically described in relation to the drawings.

DESCRIPTION OF THE PREFERRED EMBODIMENT

Figure 1:
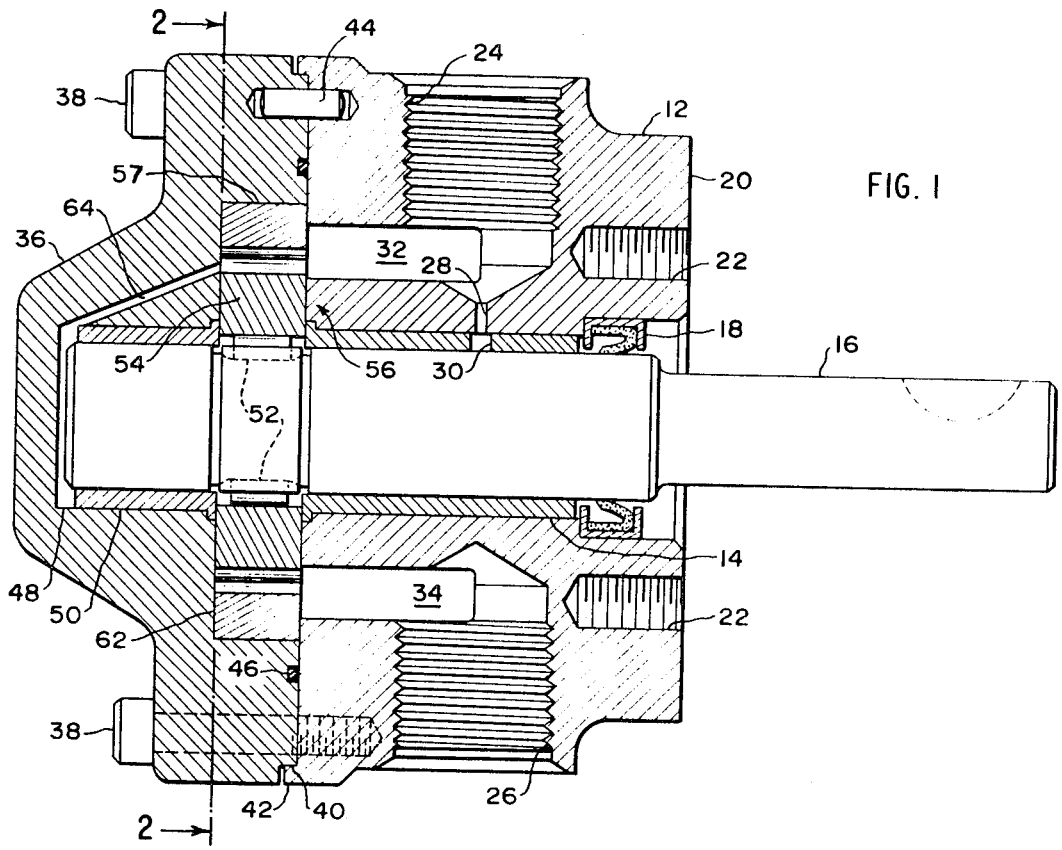
FIG. 1 is a longitudinal elevation in section on a plane through the central axis of a rotary pump having an internal gear set embodying the invention.

As this invention is concerned only with the construction of internal gear sets of the type described above, it may be employed wherever such gear sets find utility and is not limited to particular end uses. However, solely for the purpose of completeness of description the appended drawing shows a typical application thereof to a lubricating oil pump.

In devices of the type shown the inner and outer gears rotate on fixed, mutually spaced axes. However, the novel gear set can be employed in other types of devices wherein one of the gears is held fixed and the other rotates about its own axis which in turn orbits about the axis of the fixed gear. Also the devices may be pumps, motors or transmissions of various kinds, as will be apparent to persons familiar with this art.

The pump has a mounting plate 12 of annular shape with a central bore in which a sleeve bearing 14 is fitted to receive a drive shaft 16. A bearing seal 18 of a suitable type is received in an annular enlargement of the bore at one end of the bearing sleeve. The plate 12 also has a flat mounting surface 20 and tapped holes 22 for mounting the pump on a suitable support.

Two blind diametral holes are drilled and tapped in the plate 12 to define a pressure port 24 and a suction port 26. These ports respectively receive the pressure and suction lines of the pump. The pressure port 24 preferably communicates with a substantially smaller hole 28 that permits oil from the circulating lines to reach the bearing through an aligned hole 30 in the sleeve 14.

Figure 2:
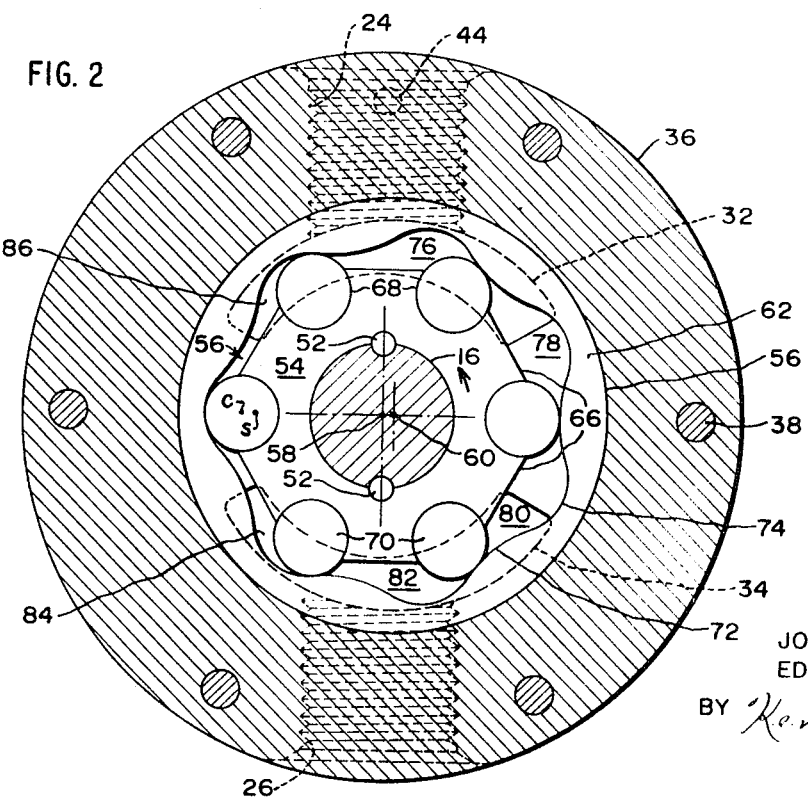
FIG. 2 is a transverse elevation in section taken on line 2—2 of FIG. 1 showing the construction of the novel internal gear set.

Each of the ports 24 and 26 communicates with one face of the plate 12 through a tapered arcuate aperture or port 32 or 34, respectively, the outlines of these apertures or ports being shown by broken lines in FIG. 2.

A housing 36 is bolted on the plate 12 by bolts 38. To ensure accuracy of positioning transversely to the shaft axis, the housing has an accurately machined annular shoulder 40 fitting within a flange 42 formed by an accurate counterbore on the mating face of the plate. To ensure accuracy of positioning angularly about the shaft axis the housing and plate have holes to receive the ends of a locating pin 44. A circular O-ring seal 46 is also provided between the housing and plate.

The housing has an accurate blind central bore 48 concentric with the shaft axis. In this bore a sleeve bearing 50 is fitted to receive the shaft 16. The shaft, which has its axis fixed in relation to the support on which the pump is mounted, receives and is keyed by means of cylindrical keys 52 to a support member 54 forming a part of an inner gear 56.

The housing 36 has a counterbore 57 machined eccentrically to the axis of the shaft 16. In FIG. 2 the axis of the shaft is shown at 58 and that of the counterbore 57 is shown at 60. Within this counterbore is fitted an outer gear or internally generated rotor 62. A vent 64 is drilled diagonally through the housing 36 from a point on the end of the counterbore inward of the outer gear 62, to the root of the bore 48, and serves to prevent pressure loading of the shaft.

The inner and outer gears are constructed as follows. Each of the gears is formed from flat plate stock having precisely parallel surfaces. The support 54 is formed by machining a number of parallel holes of equal diameter equally spaced radially from and angularly about the axis 58. The edges of the plate are then cut to produce flat surfaces 66 intersecting the drill holes, leaving fragmental cylindrical recesses or pockets 68 defining the tooth spaces of the inner gear and opening through the outer periphery thereof. Solid metal cylindrical tooth members or rolls 70 are slidably received, preferably with a slip fit, in the recesses or pockets. These rolls have substantially the same diameter as the holes from which the recesses are formed. The length of the tooth members or rolls 70 equals the thickness of the support 54 in the embodiment shown, but is greater when end rings are used as described below. Thus the tooth members project radially beyond the openings through the outer periphery of the inner gear to provide the teeth for the inner gear.

The outer gear 62 is formed on a standard Fellows gear shaper or any other known machine for producing the desired shape, thereby producing teeth 72 and tooth spaces 74. The number of teeth 72 is one greater than the number of cylindrical tooth members or rolls 70. The form of the teeth 72 and tooth spaces 74 is thereby generated as the conjugate of the inner gear.

This outer gear shaping operation may be understood by considering parts of FIG. 2 as a plan view of a commercially available Fellows gear shaper, wherein the part 36 represents the horizontal bed of the machine rotating about a fixed axis represented at 60 in the drawing, and the part 62 represents the workpiece which is initially a blank ring mounted on the bed so as to be rotatable about its own axis, this axis being coincident with the axis 60. One of the parts 70 in the figure may be considered as representing a circular metal cutting tool having an axis $c$ and a diameter equal to that of one of the tooth members 70. The cutting tool is mounted upon the cutter spindle of the gear shaper, which has a fixed axis $s$ at right angles to the plane of the sheet. The spindle moves in axial strokes in the manner characteristic of gear shapers. Thus, instead of mounting the circular cutting tool coaxially with its spindle as is usually done when shaping internal gears, it is secured to the spindle eccentrically with its axis $c$ spaced from the axis $s$ of the spindle by the eccentricity which is equal to the distance between the axes 58 and 60 in the finished pump. The axis $s$ of the spindle is also spaced from that of the blank (represented at 60) by the pitch radius of the inner gear.

During the gear cutting operation the axis $c$ rotates at constant speed around the fixed axis $s$. Also, the blank rotates around its fixed axis 60 at a constant speed synchronized therewith and in the same sense or direction. This is accomplished by suitable adjustment of the gear train on the shaper between the cutter spindle and the bed. It will be seen that one tooth of the outer gear blank is formed in each revolution of the axis $c$, and therefore the gearing is such that in one complete revolution of the blank there are as many revolutions of the axis $c$ as there are teeth to be cut in the outer gear, namely, one more than the number of teeth in the inner gear 56.

Therefore, it will be evident that in operation of the pump, every tooth member or roll 70 of the inner gear will theoretically remain continuously in contact with the surface of the outer gear, thereby creating as many expansible and contractable interstitial spaces or chambers as there are teeth on the inner gear. In FIG. 2 these chambers are designated 76, 78, 80, 82, 84 and 86. If the shaft 16 is rotated in the direction of the arrow, the outer gear 62 is constrained to rotate about the axis 60 at a somewhat lower velocity which bears the same ratio to that of the shaft as the number of tooth members on the inner gear bears to the number of teeth on the outer gear. The chambers therefore progress counterclockwise as viewed in FIG. 2. It will be seen that the chambers in communication with the aperture or port 32 are contracting in volume, while those in communication with the aperture or port 34 are expanding. Therefore, the device pumps fluid from the suction port 26 to the pressure port 24, each chamber progressing through a complete cycle of expansion and contraction in one revolution of the shaft. The total volume displaced by one chamber per cycle, times the number of chambers, equals the theoretical pump displacement per cycle.

The gear set herein described is characterized by rolling action of the individual tooth members or rolls 70 on the internally generated surface of the outer gear 62, as contrasted to sliding action that takes place in many of the commonly used internal gear sets of this general type. This rolling action entails rotational sliding of each tooth member or roll 70 within its individual recess or pocket 68. Because of this rolling contact, the load capability is greatly increased through the elimination of wear resulting from galling, welding and scoring associated with sliding friction. The rolling action also permits very tight fitting between the two gears, thus reducing fluid leakage and providing a fluid displacement unit of high volumetric and mechanical efficiency. Since the rolling action also permits the two members to operate at higher gear pressure angles than would otherwise be possible, greater displacement is possible than would be the case with conventional elements of the same size.

As both elements of the gear set rotate, the rolls 70 travel around the center line of the shaft in a circle while rotating in their pockets. If desired, the ends of the rolls may be supported on either side in holes in metal end rings that turn with the inner member in annular grooves provided in the housing 36 and plate 12. These rings would thus support the rolls, relieving the shaft of much of the load imposed on it as a result of hydraulic pressure, and making possible operation at higher pressure without creating severe shaft-bearing loads, previously a limiting factor in conventional internal gear fluid displacement elements.

The relative ease with which the inner gear may be manufactured without sacrifice in precision will also be evident. Since very close tolerances may be imposed as a result of the simplicity of manufacture, there is a decrease in mechanical losses and a resultant increase in overall efficiency.

Alternative structures of the inner gear may be employed, in addition to which the number and diameter of the tooth members 70 may be chosen to conform to particular operational specifications. Thus the support member 54 may be constructed of various materials and may take various forms consistently with the provision of recesses for the tooth members. These forms may be selected to reduce further the weight of the gear set. The tooth members may be keyed to the recesses 68, or force-fitted in the recesses, but a slip fit permits them to creep rotatively in the recesses in use as described above, thereby improving wear.

Also, the tooth members 70 may be of tubular or sleeve form, that is, of hollow cylindrical form, thereby reducing weight. They may also be in the form of cylinders over which wear sleeves of the same or a different material are fitted. The outer surfaces may be treated to resist wear, particularly when light weight materials such as aluminum are employed. Further, the surfaces of the recesses 68 may be more or less than semicylindrical since in all positions the outer gear is so designed as to retain the tooth members within their respective recesses.

Although the gear set has been described as embodied in a pump, it can be employed either with or without fluid displacement. For example, it can be employed as a gear reducer as well.

We claim:

1. An internal gear set comprising, in combination,
   an inner member including a support having a predetermined number of fragmental cylindrical recesses equally spaced about its periphery and a rigid cylindrical tooth member received in each recess in rotational sliding contact therewith, each tooth member having substantially the same diameter as the corresponding recess, a portion of each tooth member projecting from said periphery, and
   an internally toothed outer formed as the conjugate of the inner member, having simultaneous rolling engagement with all of the tooth members and having a number of teeth one greater than said predetermined number.

2. A gear set according to claim 1, in which the outer member has a surface configuration conforming to the outline generated by the projection of the inner member thereon when said members are respectively rotated about spaced parallel axes at a speed ratio equal to the inverse of their tooth ratio.

3. A gear set according to claim 1, in which the cylinders are captured in the recesses.

4. An internal gear set comprising in combination,
   an inner member including a support having a first axis therein, said support having a predetermined number of fragmental cylindrical recesses about its periphery, said recesses being equally spaced radially from and angularly about said axis, and a rigid cylindrical tooth member received in each recess in rotational sliding contact therewith, each tooth member having substantially the same diameter as the corresponding recess, a portion of each tooth member projecting from said periphery, and an internally toothed outer member formed as the conjugate of said inner member, having simultaneous rolling engagement with all of the tooth members, and having a number of teeth one greater than said predetermined number and equally spaced radially from and angularly about a second axis parallel to the first axis and spaced therefrom.

5. A gear set according to claim 4, in which the outer member has a surface configuration conforming to the outline generated by the projection of the inner member thereon when said members are rotated about their axes at a speed ratio equal to the inverse of their tooth ratio.

6. In an internal gear-type fluid-pressure device including a first gear surrounded by and meshed with a second gear, one of said gears having one less tooth than the other gear, said gears being relatively rotatable, one of said gears being mounted for rotation about an axis displaced relative to that of the other gear, said first gear having circumferentially spaced fragmental cylindrical recesses around the outer periphery thereof opening through said outer periphery, cylindrical tooth members mounted in said recesses and projecting beyond said openings through the outer periphery of the first gear to provide the teeth for said first gear, said second gear and the first gear cooperating with the tooth members to form expanding and contracting chambers therebetween, said second gear simultaneously contacting tooth members in all positions of the gears to form seals, and passages communicating with the chambers for flow of fluid into the expanding chambers and out of the contracting chambers.

* * * * *